(12) United States Patent
Povey et al.

(10) Patent No.: US 12,314,320 B2
(45) Date of Patent: May 27, 2025

(54) GENERATION OF VISUAL REPRESENTATIONS OF FACILITY COMPONENTS

(71) Applicant: Cerebre Co., Needham, MA (US)

(72) Inventors: Robert Povey, Needham, MA (US); Jeffrey Robbins, Needham, MA (US)

(73) Assignee: Cerebre Co., Needham, MA (US)

( * ) Notice: Subject to any disclaimer, the term of this patent is extended or adjusted under 35 U.S.C. 154(b) by 0 days.

(21) Appl. No.: 18/201,733

(22) Filed: May 24, 2023

(65) Prior Publication Data
US 2024/0394312 A1    Nov. 28, 2024

(51) Int. Cl.
| | | |
|---|---|---|
| G06F 16/00 | (2019.01) | |
| G06F 16/901 | (2019.01) | |
| G06F 16/9035 | (2019.01) | |
| G06F 16/9038 | (2019.01) | |

(52) U.S. Cl.
CPC ...... *G06F 16/9035* (2019.01); *G06F 16/9024* (2019.01); *G06F 16/9038* (2019.01)

(58) Field of Classification Search
CPC ............ G06F 16/9035; G06F 16/9024; G06F 16/9038
See application file for complete search history.

(56) References Cited

U.S. PATENT DOCUMENTS

| | | | | |
|---|---|---|---|---|
| 8,700,611 | B2* | 4/2014 | Kelshikar | G06F 16/2471 |
| | | | | 707/758 |
| 2020/0159723 | A1* | 5/2020 | Goyal | G05B 15/02 |
| 2020/0201875 | A1 | 6/2020 | Wu et al. | |
| 2021/0318671 | A1* | 10/2021 | Janka | G06F 30/18 |
| 2022/0067233 | A1* | 3/2022 | Blackwell | A63F 13/65 |
| 2022/0414228 | A1* | 12/2022 | Difonzo | G06F 16/24522 |
| 2023/0213922 | A1* | 7/2023 | Bharadwaj | G05B 13/04 |
| | | | | 703/13 |
| 2023/0237249 | A1* | 7/2023 | Kumar | G06Q 10/067 |
| | | | | 715/234 |

FOREIGN PATENT DOCUMENTS

| | | |
|---|---|---|
| CN | 113010612 | 6/2021 |
| EP | 3 748 518 | 12/2020 |

OTHER PUBLICATIONS

Foreign Search Report on PCT Dtd Sep. 20, 2024.

\* cited by examiner

*Primary Examiner* — Paul Kim
(74) *Attorney, Agent, or Firm* — Foley & Lardner LLP

(57) ABSTRACT

A method may include obtaining a graph including components of a facility and connections among the components, receiving a query corresponding to a subset of the components, and generating, based on the graph and according to the query, a visual representation comprising the subset of the components and connections among the subset of the components.

15 Claims, 9 Drawing Sheets

GENERATION OF VISUAL REPRESENTATIONS OF FACILITY COMPONENTS

BACKGROUND

Piping and Instrumentation diagrams (P&IDs) are used to show the interconnection of process equipment and instrumentation to control the process. Facilities, such as manufacturing plants, power plants, and refineries, include a variety of processes represented by a variety of different P&IDs. Understanding an entire facility by interpreting the P&IDs can be a difficult task.

SUMMARY

Aspects of the present disclosure relate to a method including obtaining, by one or more processors, a graph including components of a facility and connections among the components, receiving, by the one or more processors, a query corresponding to a subset of the components; and generating, by the one or more processors, based on the query, a visual representation including the subset of the components and connections among the subset of the components.

Aspects of the present disclosure relate to a non-transitory, computer-readable medium including instructions which, when executed by one or more processors, cause the one or more processors to obtain a graph including components of a facility and connections among the components, receive a query corresponding to a subset of the components; and generate, based on the query, a visual representation including the subset of the components and connections among the subset of the components.

Aspects of the present disclosure relate to a method including obtaining, by one or more processors, a graph comprising objects of a facility and connections among the objects, determining, by the one or more processors, based on the graph, a position associated with each of a subset of the objects of the facility, mapping, by the one or more processors, based on the graph, each of the subset of the objects of the facility to a symbol, and generating, by the one or more processors, a visual representation of the subset of the objects of the facility, the visual representation based on the determined positions and including one or more of the mapped symbols.

Figure 1:
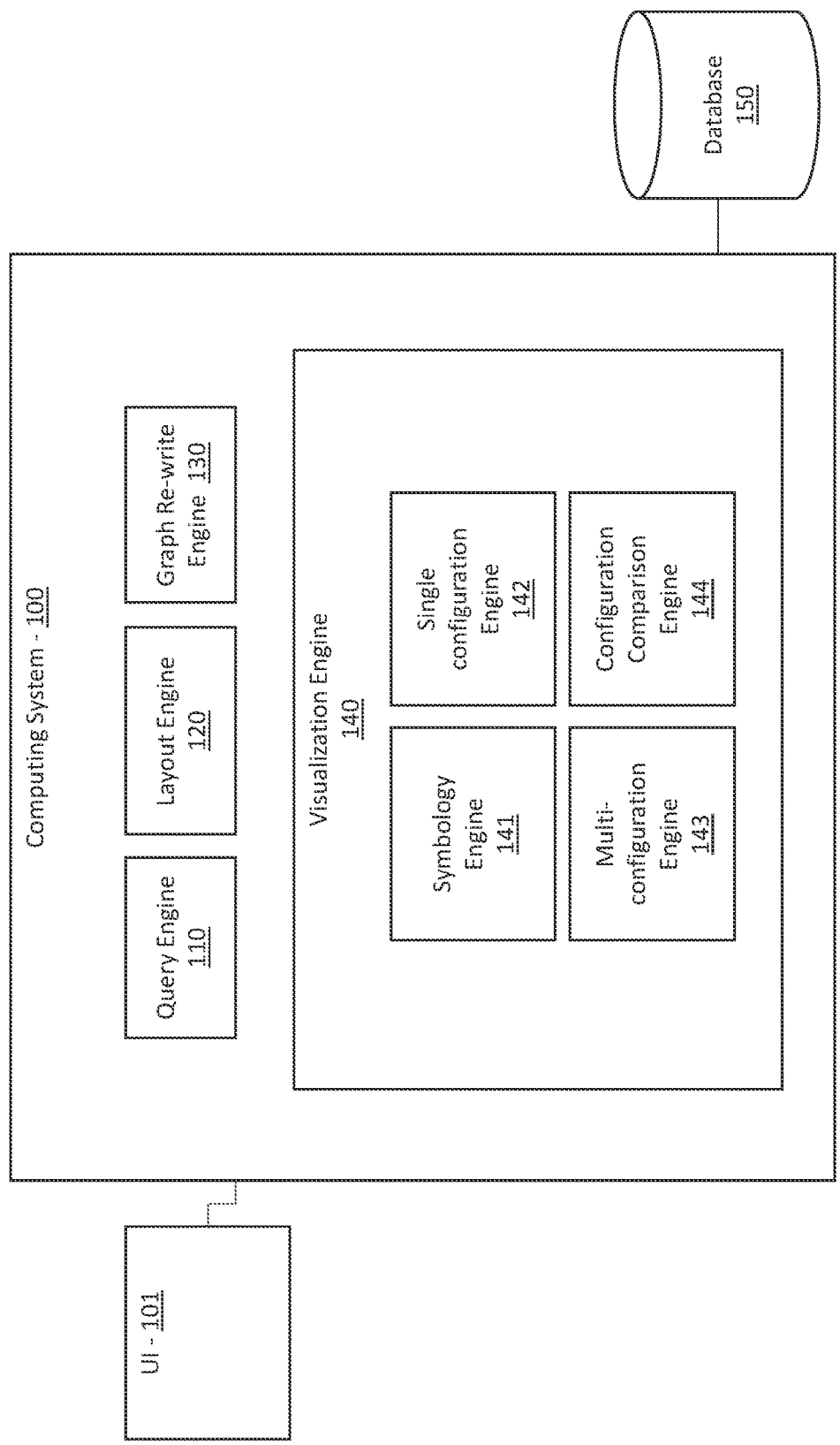
FIG. 1 illustrates an example computing system, in accordance with one or more embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

This disclosure relates to generating visual representations of graphs and graph data. Specifically, certain embodiments discussed herein relate to generating visual representations of graphs corresponding to components of a facility. Embodiments discussed herein solve the technical problem of visualizing facilities having multiple components and various connections between the components. Conventional methods include analyzing separate Piping and Instrumentation Diagrams (P&IDs) which illustrate different aspects of a facility. This requires specialized knowledge and expertise and does not allow for visualization of the entire facility or portions of the facility for which a corresponding P&ID does not exist. By generating a visual representation of components or a subset of components of a facility based on graph data according to a query, a visual representation may be generated showing the facility components corresponding to that query. The query-based visual representation may represent a portion of the facility or specific components of the facility, greatly reducing the knowledge and expertise required to analyze facilities and their components. Furthermore, visual representations can be generated in substantially real-time, facilitating analysis of various aspects of a facility and its components. By processing queries in substantially real time and generating corresponding visual representations, facility data in graph form can be made available for analysis by individuals without specialized experience with the facility.

FIG. 1 illustrates an example computing system 100, in accordance with one or more embodiments. The computing system 100 may include a query engine 110, a layout engine 120, a graph re-write engine 130, and a visualization engine 140. The computing system 100 may communicate with a user interface (UI) 101 and a database 150. In some embodiments, the computing system 100 includes the UI 101 and the database 150. The computing system 100 may include one or more processors and a memory. The memory may include instructions which cause the one or more processors to perform processes described herein.

The user interface 101 may be configured to accept user input. The user interface 101 may be configured to display information to the user. In some embodiments, the user interface 101 is part of the computing system 100. In some embodiments, the user interface 101 is part of a user device which transmits signals to and receives signals from the computing system 100. The computing system 100 may receive user input from the user interface 101 and return a visual representation to be displayed at the user interface 101. In an example, the computing system 100 receives, at or from the user interface 101, a query associated with a subset of components of a facility and the computing system 100 returns a visual representation of the subset of components of the facility. The computing system 100 may process the query in substantially real time. The computing system 100 may generate the visual representation in substantially real time.

The query engine 110 accepts a query from the user interface 101. The query engine 110 may parse the query to return a response to the query. The response may be displayed on the user interface 101. The query engine 110 may call the layout engine 120, the graph-rewrite engine 130, and/or the visualization engine 140 to generate the response. In some embodiments, the query engine 110 forwards the query to the layout engine 120, the graph-rewrite engine 130, and/or the visualization engine 140 to generate the response. The query engine 110 may determine, based on the query, which of the layout engine 120, the graph re-write engine 130, and/or the visualization engine 140 to call or to send the query. The query may include one or more criteria. The visual representation may be generated based on the one or more criteria. The one or more criteria may include, but is not limited to, a level of detail, a component type, and a proximity to a component specified in the criteria.

The level of detail may be based on a user, a role of the user, and/or a task performed by the user. In an example, the level of detail may exclude valves based on user preferences of the user. In another example, the level of detail may include flanges based on a role of the user. In another example, the level of detail may include blowers based on a task of the user associated with blowers.

The query may be a query to find and/or display a component. In an example, the computing system 100 generates a visual representation including the component. In this example, the visual representation may include other components and an indication of the queried component. The other components in the visual representation may be determined on a level of detail.

The query may be a query to find and/or display components near a component. In an example, the query may include a criteria or a level of detail may determine that only components within three degrees of connection of the component are to be displayed. In an example, the query may include a criteria or a level of detail may determine that only components within a certain proximity of the component are to be displayed.

The query may be a query to find and/or display a path between two or more components. The query may be a query to modify a visual representation to indicate the path. The query may be a query to generate a visual representation including the path. In an example, the query may include a criteria or a level of detail may determine that only components on the path are displayed. In an example, the query may include a criteria or a level of detail may determine that components on the path and components connected to the components on the path are displayed. The path may be, but is not limited to, a logical, electrical, fluid, or mechanical path.

The query may be a query to find and/or display a configuration of two or more components. The query may be a query to modify a visual representation to indicate the configuration. The query may be a query to generate a visual representation including the configuration. The configuration may be, but is not limited to, an arrangement of two or more components, a subsystem of the facility, or a combination of two or more components.

The query may be a query to find and/or display multiple configurations of two or more components. The query may be a query to modify a visual representation to indicate the multiple configurations. The query may be a query to generate a visual representation including the multiple configurations. The configurations may be, but are not limited to, an arrangement of two or more components, subsystems of the facility or multiple facilities, or combinations of two or more components. In some embodiments, the multiple configurations share one or more common characteristics. In an example, the multiple configurations are similar subsystems of two different facilities. In another example, the multiple configurations are identical combinations of components in two or more different locations in a facility.

The query engine 110 may find the component, path, configuration, or configurations in the graph. The query engine 110 may query the graph to find the component, path, configuration, or configurations in the graph. The query engine 110 may send the component, path, configuration, or configurations to the layout engine 120.

The layout engine 120 determines, based on a graph of components of a facility, a layout of the components or a subset of the components. The layout engine may determine the layout for components based on the query. The layout engine 120 may receive the components associated with the query from the query engine 110. The layout engine 120 determines a symbol for each component and/or each connection. The layout engine 120 may determine points of connection for each symbol for each component. The graph may include points of connection for the components. The layout engine 120 may determine points on the symbols corresponding to the points of connection. In an example, a vessel is illustrated on a P&ID as having a pipe connected to a point of connection at an end of the vessel, which point of connection is encoded in the graph. The layout engine 120 may determine a point on a symbol corresponding to the vessel to represent the point of connection. The layout engine 120 may arrange connections between the components based on the points of connection of the components. The layout engine 120 may determine a class or type of symbol for each component and/or each connection. The layout engine 120 determines an orientation, position, and rotation for each symbol. The orientation, position, and rotation for each symbol may be based on a physical orientation, position and rotation of the corresponding component. The orientation, position, and rotation for each symbol may be based on the user, the role of the user, the task performed by the user, and/or one or more criteria in the query. The layout engine 120 may determine a size for each symbol. The layout engine 120 may determine a relative size for each symbol relative to other symbols. The size for each symbol may be based on physical size of the corresponding component, role in the facility, role in a subsystem of the facility, role in a specified configuration, and/or role in the visual representation. In an example, a component has a larger relative size than other components based on the component being specified in a query to display components connected to the component. In another example, a vessel has a larger relative size than other components based on the vessel being a central component of a subsystem of the facility specified in a query.

The layout engine 120 may determine the orientation, position, rotation, and size of one or more components based on the one or more components being part of a larger system or component. In some embodiments, the one or more components are sub-components of a component. In an example, a reactor has multiple sub-components such as a distributor, a catalyst, a support grid, a mist eliminator, and a bottom basket. The layout engine 120 determines the orientation, position, rotation, and size of the multiple sub-components such that the multiple sub-components are part of the reactor.

The layout engine 120 may determine the orientation, position, and rotation of symbols corresponding to connections between components based on a direction of the connections. In an example, the layout engine may determine an orientation of a symbol representing a pipe based on a direction of flow of the pipe. The symbol representing the pipe may include one or more markings indicating the direction of flow.

The layout engine 120 may plot a path between two or more components. The layout engine 120 may plot a path between two or more components based on a query or request from the query engine 110. The layout engine 120 may determine the layout of the components based on the path. In an example, the layout engine 120 arranges components adjacent the path to clearly show the path. The layout engine may adjust the size of the components based on the path. In an example, two components on the ends of a path are larger than components on the path between the two components.

The layout engine 120 may modify the layout of components. The layout engine 120 may add, remove, or move symbols in a visual representation. The layout engine 120 may add, remove, or move the symbols based on a query or request from the query engine 110. The layout engine 120 may add, remove, and/or move symbols based on user input from the user interface 101. In an example, the layout engine 120 may move a component based on a user dragging the component from a first position to a second position on the user interface 101. In this example, the layout engine 120 may add, remove, and/or move symbols based the user moving the component from the first position to the second position. The layout engine 120 may add, remove, and/or move the symbols in substantially real time.

The layout engine 120 may optimize the layout of the components. The layout engine 120 may optimize the layout of the components based on the components included in the visual representation, the shapes of the symbols, the size of the symbols, connections between the components, and/or relevance of components to a query. The layout engine 120 may modify orientation, rotation, size, and/or geometry of symbols to optimize the layout. In an example, the layout engine 120 applies weights to each of the relevance of components to a query, the criteria of the query, user preferences, a role of the user, and/or a task performed by the user in order to optimize the layout.

The graph re-write engine 130 implements changes to the graph to update the graph. The graph re-write engine 130 may receive the changes to the graph from the user interface 101. The graph re-write engine 130 may receive user preferences from the user interface 101 and update the graph based on the user preferences. The graph re-write engine 130 may modify the graph based on a query or request from the query engine 110. The graph re-write engine 130 may update or modify the graph to generate a modified graph. The graph re-write engine may convert the graph from a logical graph model to a visual graph model to generate the modified graph. The graph re-write engine 130 may replace groups of nodes and edges with nodes or edges, replace nodes and edges with different nodes or edges, and/or remove nodes or edges. The graph re-write engine 130 may generate the modified graph based on the query, the criteria of the query, a level of detail, user preferences, the role of the user, and/or the task performed by the user. The graph re-write engine 130 may send the modified graph to the layout engine 120 to determine the layout based on the modified graph.

The visualization engine 140 generates a visual representation of the graph. The visualization engine 140 may generate the visual representation of the graph or modified graph based on input from the query engine 110 and/or the layout engine. The visualization engine 140 may include a symbology engine 141, a single configuration engine 142, a multi-configuration engine 143, and a configuration comparison engine 144. The visualization engine 140 may hide one or more symbols in the visual representation based on a level of detail, user preferences, a user selection, user role, or task being performed by the user, as discussed herein. In some embodiments, the visualization engine 140 hides or shows one or more symbols in the visual representation based on a level of importance of one or more components. In an example, one or more components are classified as "major equipment" having a high level of importance such that they are not hidden in the visual representation. The level of importance assigned to the components may depend upon the user preferences, the user selection, the user role, or the task being performed by the user. In some embodiments, the visualization engine 140 replaces the hidden components with one or more other symbols. In an example, the visualization engine 140 replaces one or more hidden components with a junction. In an example, the visualization engine 140 replaces one or more hidden components of a subsystem with a symbol corresponding to the subsystem, with one or more inputs and/or outputs of the subsystem corresponding to aggregate inputs and/or outputs of the one or more hidden components.

The symbology engine 141 may map the components of the facility to symbols. The symbology engine 141 may map the components to symbols of a symbol library, such as a symbol library on the database 150. The symbology engine 141 may select a symbol from the symbol library for a component based on the query, user preferences, the user role, the task performed by the user, the facility, a type of the facility, and/or one or more industry standards. The symbology engine 141 may render the symbols corresponding to the components to generate the visual representation. The symbology engine 141 may generate the visual representation based on the layout determined by the layout engine 120.

The symbology engine 141 may indicate an origin of the symbols. In some embodiments, the symbology engine 141 modifies a color of the symbols based on a P&ID from which the symbol originated. In an example, the symbology engine 141 colors a first symbol blue based on the first symbol originating from a first P&ID and a second symbol red based on the second symbol originating from a second P&ID. In this way, a user can easily see how the graph includes components from multiple P&IDs and can troubleshoot issues associated with a particular P&ID.

The single configuration engine 142 may generate the visual representation including a configuration of components. The single configuration engine 142 may generate the visual representation based on the layout from the layout engine 142. The single configuration engine 142 may generate the visual representation including elements that indicate roles and/or functions of components within the configuration. In an example, the single configuration engine 142 may generate the visual representation including components highlighted in different colors to indicate different functions. In another example, the single configuration engine 142 may generate the visual representation including components of the configuration highlighted to indicate the configuration.

The single configuration engine 142 may modify the visual representation to denote a configuration of components. The single configuration engine 142 may modify the visual representation based on an updated layout from the layout engine 142. The single configuration engine 142 may modify the visual representation including elements that indicate roles and/or functions of components within the configuration. In an example, the single configuration engine 142 may modify the visual representation to highlight components in different colors to indicate different functions. In another example, the single configuration engine 142 may modify the visual representation to highlight components of the configuration to indicate the configuration.

The multi-configuration engine 143 may generate the visual representation including a first configuration of components and a second configuration of components. The multi-configuration engine 143 may generate the visual representation including any number of configurations. The multi-configuration engine 143 may generate the visual representation based on the layout from the layout engine 142. The multi-configuration engine 143 may generate the visual representation including elements that indicate roles and/or functions of components within the configurations. In an example, the multi-configuration engine 143 may generate the visual representation including components highlighted in different colors to indicate different functions, with separate configurations highlighted in different colors and/or bounded by one or more indicators. In another example, the multi-configuration engine 143 may generate the visual representation including components of the configurations highlighted to indicate the configurations. In some embodiments, the multi-configuration engine 143 may display the multiple configurations on a single canvas, with indicators, such as boxes to indicate the multiple configurations. In some embodiments, the multi-configuration engine 143 may display the multiple configurations on separate canvases.

The multi-configuration engine 143 may modify the visual representation to denote a first configuration of components and a second configuration of components. The multi-configuration engine 143 may modify the visual representation to denote any number of configurations of components.

The configuration comparison engine 144 may modify the visual representation to show similarities and/or differences between two or more configurations.

The database 150 may be part of the computing system 100. The database 150 may be part of the user device. The database 150 may be part of a separate computing device. The database 150 may include a plurality of databases. The plurality of databases may be part of the computing system 100, part of the user device, and/or part of a separate computing device. In an example, a first database of the plurality of databases is part of the computing system 100, a second database of the plurality of databases is part of the user device, and a third database of the plurality of databases is part of a separate computing device.

The database 150 may include the graph. The graph may include a representation of objects (nodes, edges, vertices) that represent components from a set of P&ID diagrams as well as a configuration of a facility. The graph may include one or more tags associated with characteristics of the components and/or the connections between the components. The database may include one or more versions of the graph. The database 150 may include the modified graph generated by the graph re-write engine 130. The database 150 may include a plurality of modified graphs generated by the graph re-write engine 130.

The database 150 may include one or more symbol libraries. The one or more symbol libraries may include symbols used in CAD drawings, P&ID drawings, and/or industry standards. The database 150 may include one or more facility-specific symbol libraries. The one or more facility-specific symbol libraries may be based on symbols used in one or more P&IDs of the facility. The database 150 may include one or more client-specific symbol libraries. The one or more client-specific symbol libraries may be based on client preferences and may be used to provide a client with visual representations including consistent symbols. The database 150 may include one or more industry-specific and/or one or more region-specific symbol libraries. The database 150 may include one or more other drawing sources. The one or more other drawing sources may include isometric drawings, perspective drawings, and/or single-line drawings and/or their associated symbols, lines, and text. In some embodiments, the graph includes the information in the one or more other drawing sources. In some embodiments, the query engine 110, the layout engine 120, the graph re-write engine 130, and/or the visualization engine 140 may access the one or more other drawing sources. The database 150 may include one or more other data sources which may include reliability, performance, safety, environmental regulatory data associated with the components. In some embodiments, the one or more other data sources may be integrated in the graph. In some embodiments, the query engine 110, the layout engine 120, the graph re-write engine 130, and/or the visualization engine 140 may access the one or more other data sources.

Figure 2:
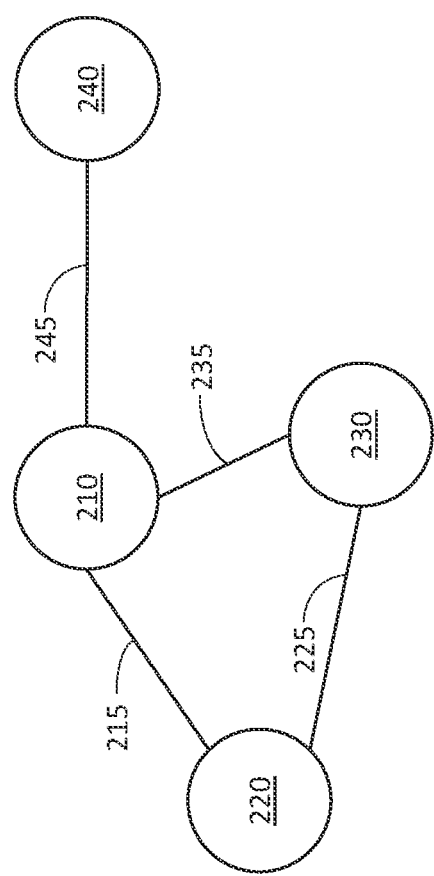
FIG. 2 illustrates an example graph, in accordance with one or more embodiments.

FIG. 2 illustrates an example graph 200, in accordance with one or more embodiments. The graph 200 may include a first node 210, a second node 220, a third node 230, and a fourth node 240. The graph 200 may include a first edge 215 connecting the first node 210 and the second node 220, a second edge 225 connecting the second node 220 and the third node 230, a third edge 235 connecting the first node 210 and the third node 230, and a fourth edge 245 connecting the first node 210 and the fourth node 240. The graph 200 may include any number of nodes and edges. The first node 210, the second node 220, the third node 230, and the fourth node 240 may represent or correspond to one or more components of the facility and/or one or more connections between components. In an example, the first node 210 represents a first component of the facility, the second node 220 represents a second component of the facility, and the first edge 215 represents a connection, such as a pipe, between the first and second components. In another example, the first node 210 represents a first connection between components, the second node 220 represents a second connection between components, and the first edge 215 represents a relationship between the first connection and the second connection. In this example, the first and second connections may be wires and the relationship may be a common voltage. In this example, the first and second connections may be pipes and the relationship may be a common fluid flowing through the pipes.

Figure 3:
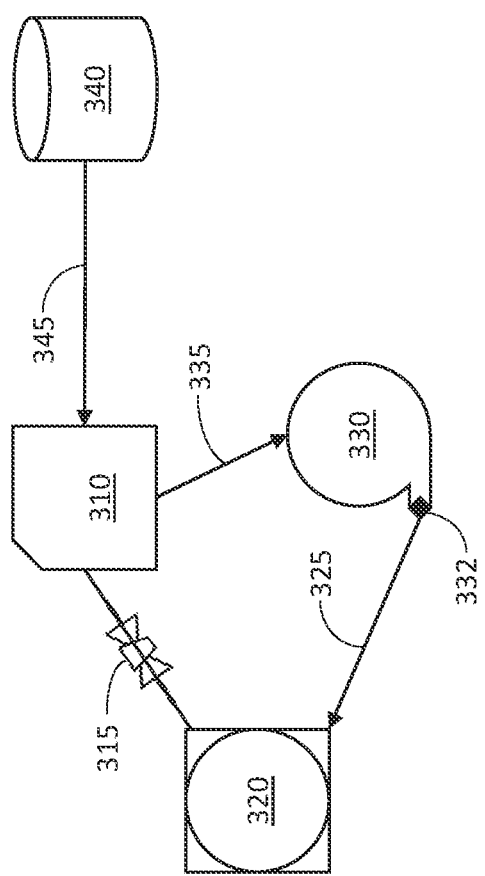
FIG. 3 illustrates an example visual representation, in accordance with one or more embodiments.

FIG. 3 illustrates an example visual representation 300, in accordance with one or more embodiments. The visual representation 300 may be generated based on the graph 200 of FIG. 2 by the computing system 100 of FIG. 1.

The visual representation 300 may include a first symbol 310, a second symbol 320, a third symbol 330, and a fourth symbol 340. The visual representation 300 may include a first connection 315 connecting the first symbol 310 and the second symbol 320, a second connection 325 connecting the second symbol 320 and the third symbol 330, a third connection 335 connecting the first symbol 310 and the third symbol 330, and a fourth connection 345 connecting the first symbol 310 and the fourth symbol 340. The visual representation 300 may include any number of symbols and connections. In some embodiments, one or more symbols in the visual representation 300 may correspond to one or more nodes in the graph 200 of FIG. 2 and one or more connections in the visual representation 300 may correspond to one or more edges in the graph 200 of FIG. 2. In some embodiments, one or more connections in the visual representation 300 may correspond to one or more nodes in the graph 200 of FIG. 2.

The first connection 315 may be represented by a symbol. The symbol may correspond to a type of connection or a component on the connection. The symbol may correspond to a type of pipe, wire, communication, or other connection between components. In some embodiments, all of the connections of the visual representation 300 are represented by symbols. In some embodiments, one or more of the connections are represented by symbols.

The third symbol 330 may include a point of connection 332. The second connection 325 may connect to the third symbol at the point of connection 332. The point of connection 332 may be at a point on the third symbol 330 that corresponds to a point of connection on the component corresponding to the third symbol 330. In an example, the third symbol 330 is a fan symbol and the point of connection corresponds to a point on the corresponding fan where a wire connects to the fan.

The second connection 325 may indicate a direction of the second connection 325. The second connection 325 may include an arrow or other marking indicating the direction of the second connection 325. The third connection 335 may indicate a direction of the second connection 335. The fourth connection 345 may indicate a direction of the fourth connection 345. In an example, the second connection 325, the third connection 335, and the fourth connection 345 are pipes and the direction of the second connection 325, the third connection 335, and the fourth connection 345 indicates a direction of flow of the pipes.

Figure 4:
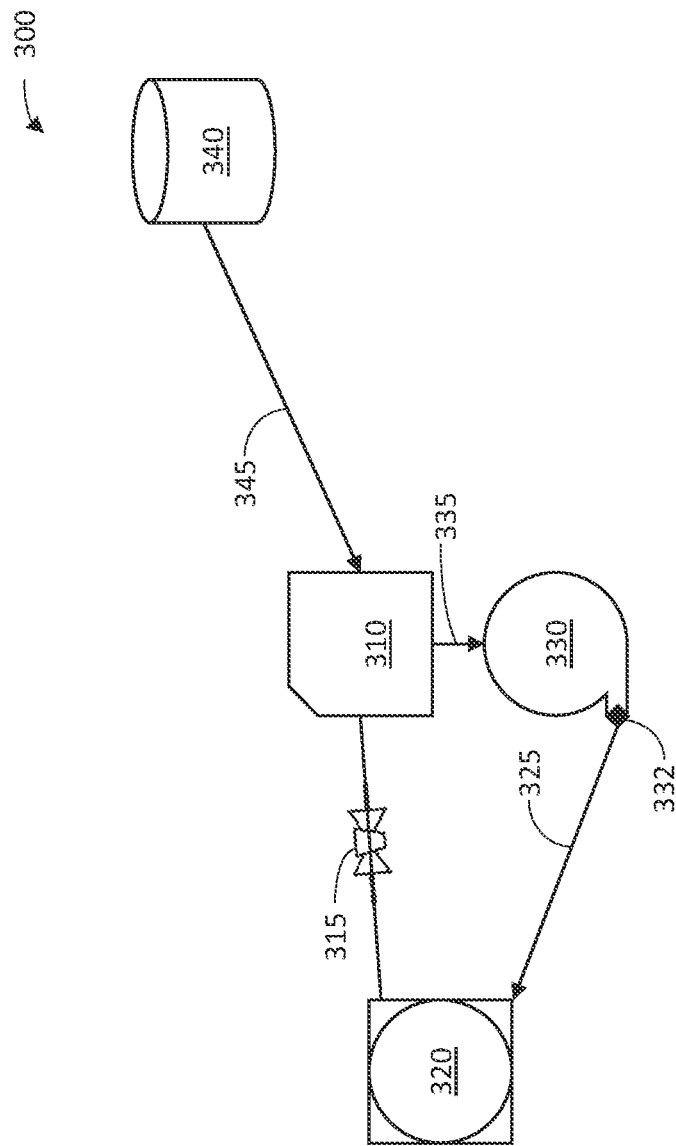
FIG. 4 illustrates an example visual representation generated using proximity data, in accordance with one or more embodiments.

FIG. 4 illustrates the visual representation 300 of FIG. 3 modified using proximity data, in accordance with one or more embodiments. In some embodiments, the visual representation 300 may be generated based on the graph 200 of FIG. 2 by the computing system 100 of FIG. 1 using the proximity data. In some embodiments, the proximity data may include data indicating physical locations of the first component 410, the second component 420, the third component 430, and the fourth component 440. In some embodiments, the proximity data may include data indicating relative locations of the first component 410, the second component 420, the third component 430, and the fourth component 440. In some embodiments, the proximity data may include data indicating relative distances between the first component 410, the second component 420, the third component 430, and the fourth component 440. The first component 410, the second component 420, the third component 430, and the fourth component 440 may be positioned in the visual representation 300 based on the proximity data. By using the proximity data to generate and/or modify the visual representation 300, analysis of interactions between components based on proximity may be visualized in real-time. In an example, the visual representation 300 of FIG. 3 may be modified in real time based on proximity data to show the visual representation 300 as shown in FIG. 4. This allows for visualization in real time of the first component 410, the second component 420, the third component 430, and the fourth component 440 based on different query criteria and data.

Figure 5:
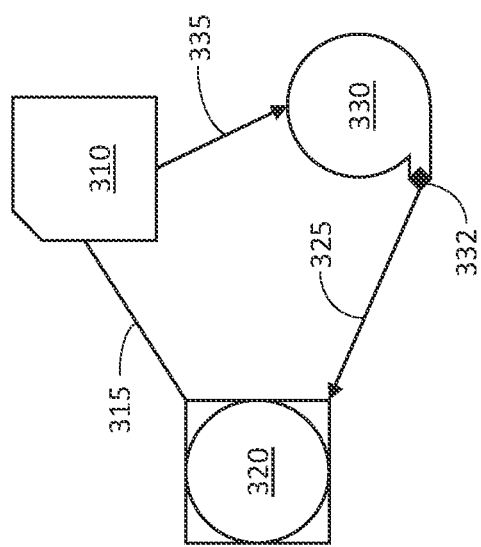
FIG. 5 illustrates an example visual representation generated using a level of detail.

FIG. 5 illustrates the visual representation 300 of FIG. 3 modified using a level of detail. In some embodiments, the visual representation 300 of FIG. 5 may be generated based on the graph 200 of FIG. 2 by the computing system 100 of FIG. 1 using the level of detail. The level of detail may be determined based on user preferences, a user role, a task being performed by the user, or user input. The level of detail may determine which components are included in the visual representation. IN FIG. 5, the visual representation 300 is modified to not include the fourth symbol 340 and the fourth connection 345 and to not represent the first connection 315 using a symbol, or to represent the first connection 315 using a different symbol.

The level of detail may be dynamically adjusted based on a user selection. In an example, the level of detail may be dynamically adjusted based on the user selecting a component in order to show more details of the component and/or display additional components connected to the selected component. In another example, the level of detail may be dynamically adjusted based on the user selecting a portion of the visual representation such that additional detail is displayed for the components in the selected portion. In another example, the level of detail may be dynamically adjusted based on a zoom selection of the user such that the level of detail is increased as the user zooms in and the level of detail is decreased as the user zooms out. Decreasing the level of detail may cause one or more components to be hidden.

Figure 6:
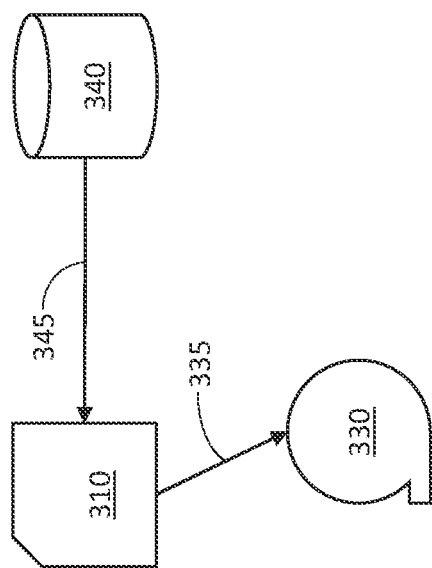
FIG. 6 illustrates an example visual representation including connections between components.

FIG. 6 illustrates the visual representation 300 of FIG. 3 modified based on connections between components. In some embodiments, the visual representation 300 of FIG. 6 may be generated based on the graph 200 of FIG. 2 by the computing system 100 of FIG. 1 based on the connections between components.

The visual representation 300 may be modified based on a query to find and display the first component 310 and other components connected to the first symbol 310 which satisfy one or more criteria. In the example shown in FIG. 6, the second symbol 320 does not match the criteria, such that only the third symbol 330 and the fourth symbol 340 are shown connected to the first symbol 310.

The visual representation 300 may be modified based on a query to find and display a path between two components. In the example shown in FIG. 6, the query is to find and display a path between the component corresponding to the fourth symbol 340 and the component corresponding to the third symbol 330. The query may include one or more criteria for displaying other components on the path between the two components. The query may include one or more criteria for a direction of connections on the path. The one or more criteria may require that connections on the path have a same direction. In an example, the one or more criteria require that a path between two components is made up of pipes that have a same flow direction, such that the path represents a flow of a liquid in the pipes between the two components. In the example shown in FIG. 6, the fourth connection 345 and the third connection 335 have a same direction.

Figure 7:
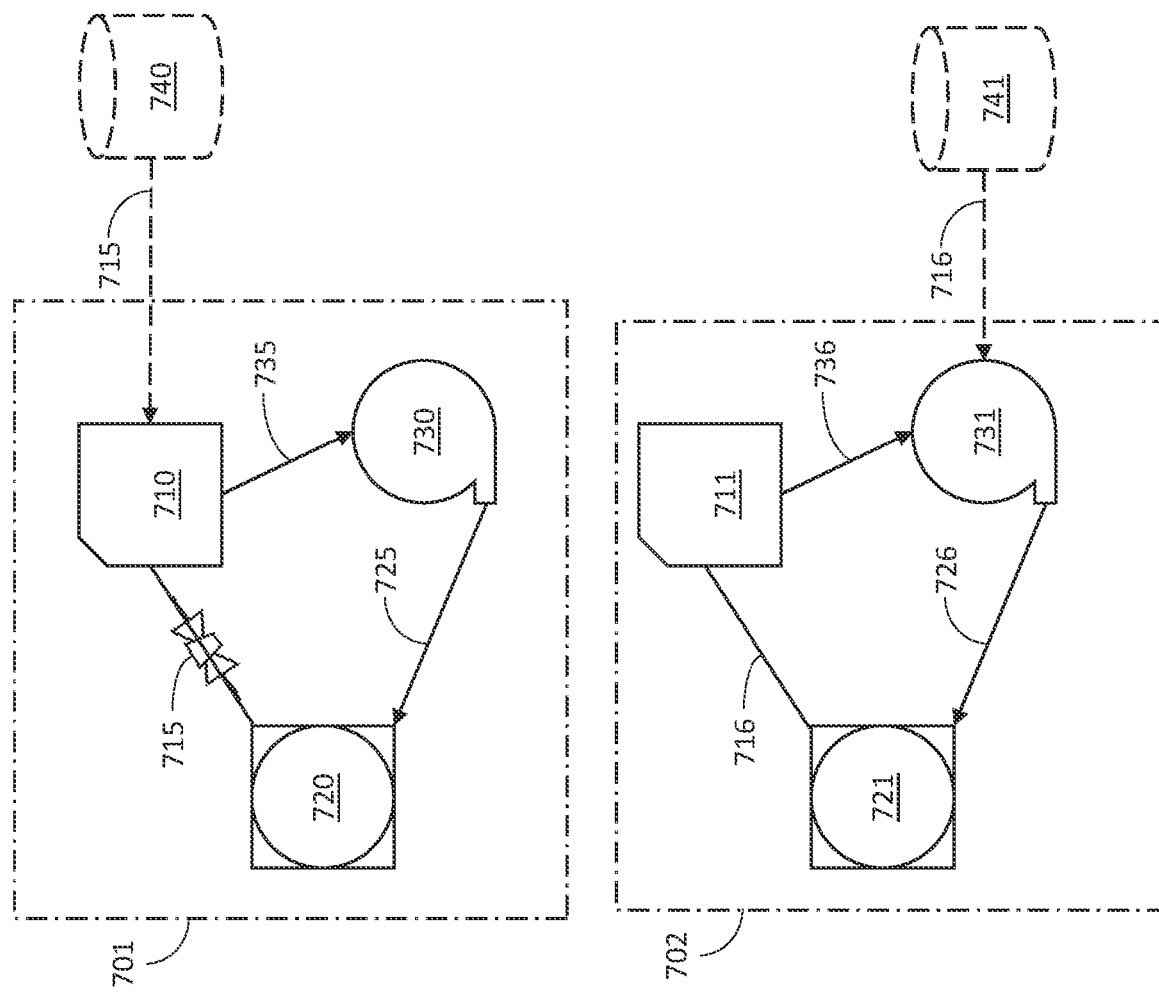
FIG. 7 illustrates an example visual representation including a subsystem.

FIG. 7 illustrates an example visual representation 700 including a first configuration 701 and a second configuration 702. The visual representation 700 may be generated based on the graph 200 of FIG. 2 by the computing system 100 of FIG. 1. The computing system 100 of FIG. 1 may modify the visual representation 300 of FIG. 3 to generate the visual representation 700.

The first configuration 701 includes a first symbol 710, a second symbol 720, and a third symbol 730. The first configuration includes a first connection 715, a second connection 725, and a third connection 735. The first symbol 710 may be connected, by a fourth connection 715, to a fourth symbol 740 which is not part of the first configuration 701. The first configuration 701 may be identified by one or more indicators, such as highlighting, a box, labels, or other visual indicators. The fourth symbol 740 and the fourth connection 715 may be identified as not being part of the first configuration 701. In an example, the fourth symbol 740 and the fourth connection 715 may be shown in dashed lines, in semi-transparent lines, or lines of a different color than the first configuration 701. The first configuration 701 may be identified in response to a query to find the configuration 701. The first configuration 701 may be identified in response to a query to find a combination of components, to find a subsystem of the facility, to find a combination of connections between components, or another query. In an example, the configuration 701 may be identified based on a query to find a gas meter and its connection to gas-firing devices. In this example, the first configuration 701 may be used to analyze greenhouse gas emissions of the facility.

The second configuration 702 includes a fifth symbol 711, a sixth symbol 721, and a seventh symbol 731. The second configuration 702 includes a fifth connection 716, a sixth connection 726, and a seventh connection 736. The seventh symbol 731 may be connected, by an eighth connection 716, to an eighth symbol 741 which is not part of the second configuration 702. The second configuration 702 may be identified by one or more indicators, such as highlighting, a box, labels, or other visual indicators. The eighth symbol 741 and the eighth connection 716 may be identified as not being part of the second configuration 702. In an example, the eighth symbol 741 and the eighth connection 716 may be shown in dashed lines, in semi-transparent lines, or lines of a different color than the second configuration 702. The second configuration 702 may be identified in response to a query to find a configuration similar to the first configuration 701. The first configuration 701 and the second configuration 702 may be identified based on a query to identify one or more instances of a combination of components, a subsystem of the facility, or a combination of connections between components. In an example, the first configuration 701 and the second configuration 702 may be identified based on a query to find all instances of a subsystem of the facility. The first configuration 701 and the second configuration 702 may be displayed on a single canvas or on separate canvases. The first configuration 701 and the second configuration 702 may be presented with similar layouts for comparing the first configuration 701 and the second configuration 702. Any number of configurations can be identified based on a query and displayed together for comparison.

Figure 8:
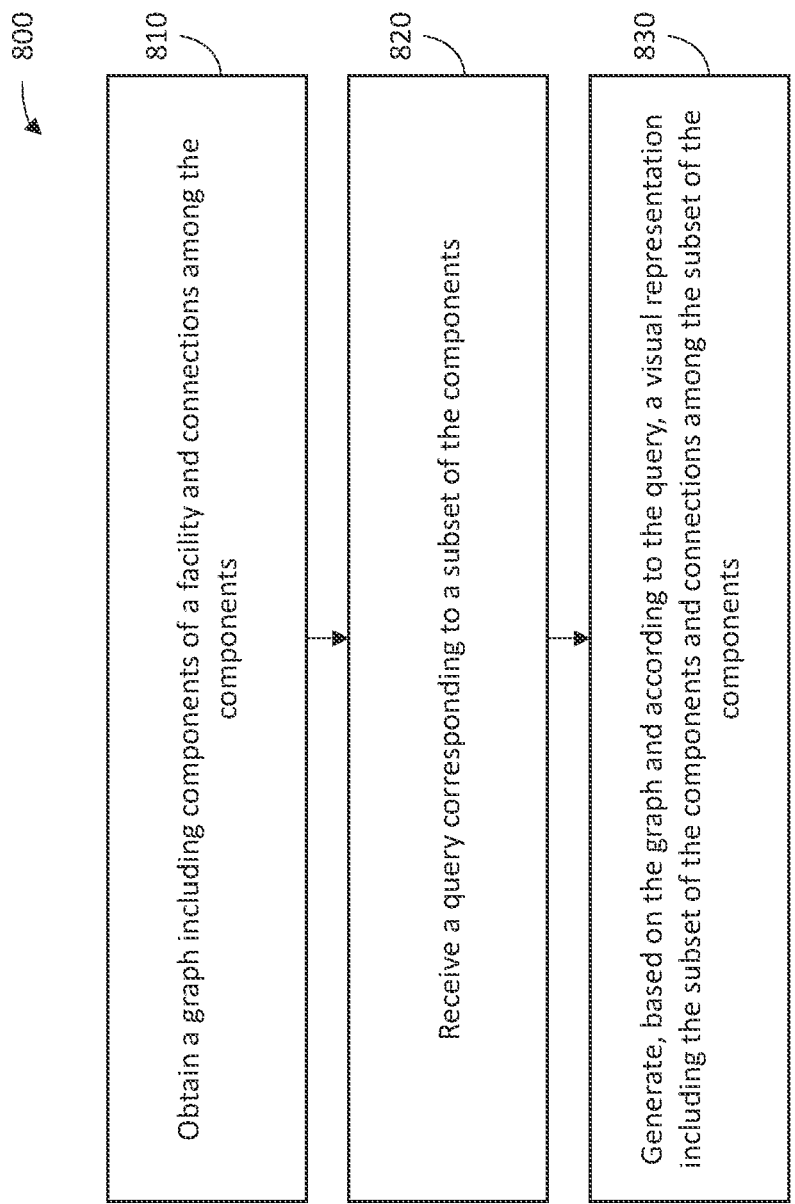
FIG. 8 is a flowchart illustrating operations of an example method for generating visual representations, in accordance with one or more embodiments.

FIG. 8 is a flowchart illustrating operations of an example method 800 for generating visual representations, in accordance with one or more embodiments. The method 800 may include additional, fewer, or different operations than shown. The operations may be performed in the order shown, in a different order, or concurrently. The method 800 may be performed by the computing system 100 of FIG. 1 or one or more elements of the computing system 100 of FIG. 1.

At 810, a graph is obtained including components of a facility and connections among the components. The facility may be a plant, such as a manufacturing plant, a refinery, or any facility having components and connections between components. The components may include instrumentation, equipment, or other components. The connections may include piping, wiring, and other connections between the components. Nodes and edges of the graph may include information associated with the components and the connections. Nodes of the graph may correspond to the components and/or the connections. Edges of the graph may correspond to the connections and/or relationships between the components and/or the connections.

At 820, a query is received corresponding to a subset of the components. In some embodiments, the subset of components corresponds to a level of detail. The level of detail may be based on user preferences, a role of the user, a task being performed by the user, or one or more criteria of the query. In some embodiments, the level of detail is dynamically adjusted based on a user selection. The user selection can include a selection of one or more components, a selection of a portion of a visual representation, or a zoom level.

At 830, based on the graph and according to the query, a visual representation is generated including the subset of the components and connections among the subset of the components.

The method 800 may include receiving user input including one or more criteria and modifying the visual representation of one or more components associated with the one or more criteria. The user input may include a level of detail. The user input may include a selection of a symbol library. The user input may include a selection of a symbol for a component. The user input may include a size, orientation, or position of one or more components.

The method 800 may include receiving user input including a selection of a first component of the components and one or more criteria and, based on the selection, generating a second visual representation including a second subset of the components of the facility connected to the first component, the second subset associated with the one or more criteria. In an example, the user input may include a query to find and display components connected via a flow line to a top tray of a tower. The second visual representation may be based on the visual representation. The visual representation may be modified to generate the second visual representation.

The method 800 may include receiving user input including a selection of a first component and a second component of the components and one or more criteria, and based on the selection, generating a second visual representation including a connection between the first component and the second component. Intermediate components in the connection may be shown based on the intermediate components being associated with the one or more criteria. The connection between the first component and the second component may be a path between the first component and the second component. In some embodiments, the path may be a shortest path between the first and second components. In some embodiments, the visual representation is modified to generate the second visual representation. In some embodiments, the first component and the second component are included in the visual representation and the user input includes a selection from the visual representation of the first component and the second component.

The method 800 may include receiving user input including one or more criteria corresponding to a subsystem of the facility, and based on the one or more criteria, modifying the visual representation to indicate the subsystem. Modifying the visual representation may include adding one or more indicators to the visual representation to indicate the subsystem, including but not limited to highlighting components of the subsystem, adding a box around the subsystem, changing a size of the components of the subsystem, and adding one or more labels to the visual representation.

The method 800 may include receiving user input including proximity data including relative locations of the components of the facility, and updating the graph based on the proximity data. The method 800 may include receiving a user selection of the proximity data, and, based on the selection, modifying the visual representation based on the proximity data. Modifying the visual representation based on the proximity data may include arranging the components in the visual representation to reflect the relative locations of the components in the visual representation. Modifying the visual representation based on the proximity data may include adding one or more indicators to indicate distances between the components. In an example, different colors, shading, or levels of transparency may be used to indicate distance from a selected component.

The method 800 may be performed in substantially real time such that the visual representation, or the second visual representation, is generated in substantially real time. In some embodiments, the visual representation is generated in less than 5 minutes, 10 minutes, or 15 minutes. The visual representation may be modified in substantially real time. In some embodiments, the visual representation is modified in less than 5 minutes, 10 minutes, or 15 minutes.

Figure 9:
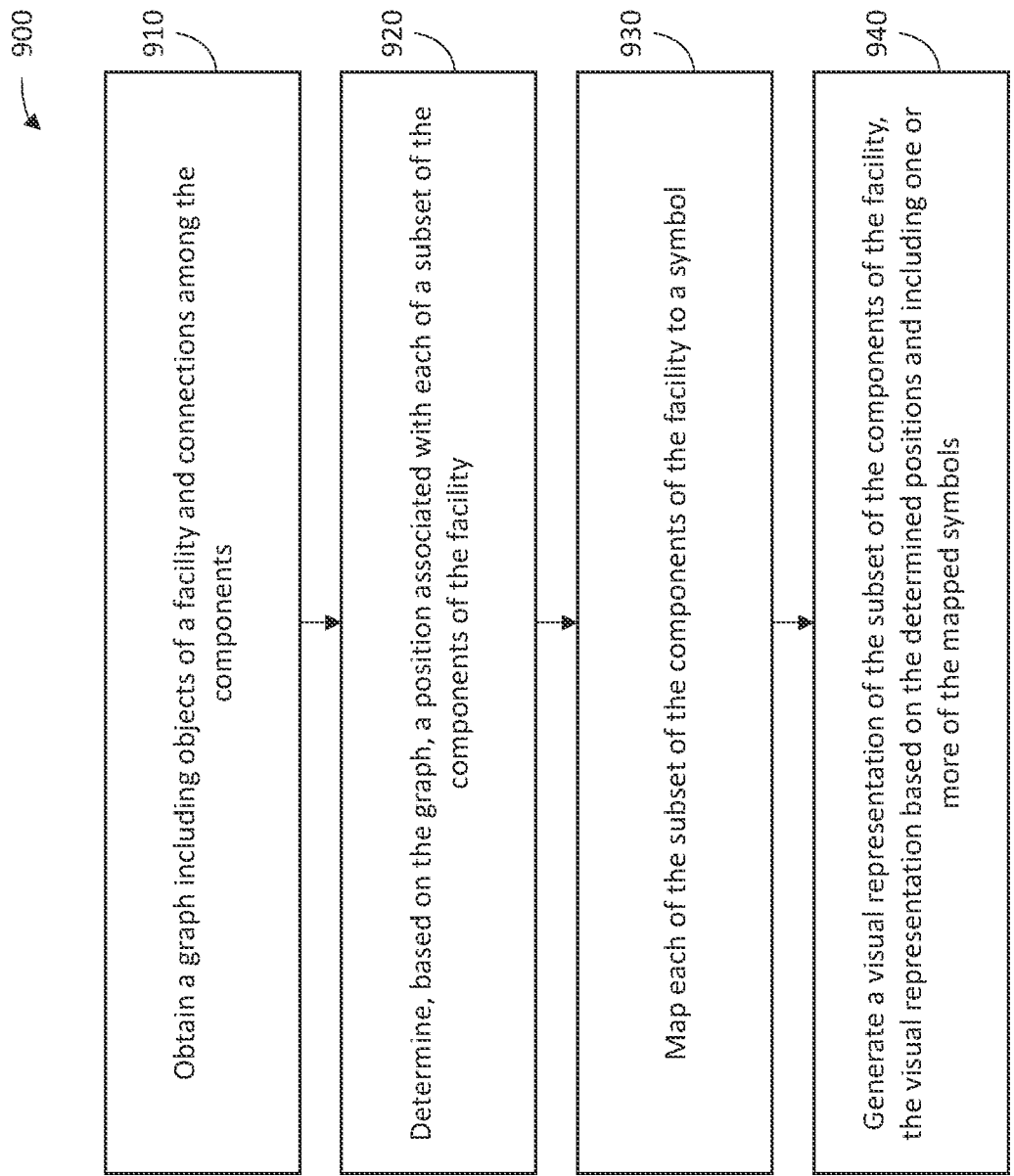
FIG. 9 is a flowchart illustrating operations of an example method for generating visual representations, in accordance with one or more embodiments.

FIG. 9 is a flowchart illustrating operations of an example method 900 for generating visual representations, in accordance with one or more embodiments. The method 900 may include additional, fewer, or different operations than shown. The operations may be performed in the order shown, in a different order, or concurrently. The method 900 may be performed by the computing system 100 of FIG. 1 or one or more elements of the computing system 100 of FIG. 1.

At 910, a graph is obtained including components of a facility and connections among the components. The facility may be a plant, such as a manufacturing plant, a refinery, or any facility having components and connections between components. The components may include instrumentation, equipment, or other components. The connections may include piping, wiring, and other connections between the components. Nodes and edges of the graph may include information associated with the components and the connections. Nodes of the graph may correspond to the components and/or the connections. Edges of the graph may correspond to the connections and/or relationships between the components and/or the connections.

At 920, based on the graph, a position associated with each of a subset of the components of the facility is determined. The position of each of the subset of the components may be based on the number, size, geometry, and orientation of the components. The position of each of the subset of the components may be based on proximity data associated with the components. The position of each of the subset of the components may be determined based on one or more connections between the components of the subset.

At 930, each of the subset of the components is mapped to a symbol. Mapping each of the subset of the components to a symbol may include identifying a symbol library and mapping each of the subset of the components to a symbol of the symbol library based on information in the graph associated with each component. Symbols may be selected based on the information in the graph based on user preferences, a user role, a task performed by the user, the facility, a type of the facility, and/or one or more industry standards. In an example, the symbols are selected based on a symbol library including symbols present in P&IDs of the facility such that the symbols for the components match the symbols used for the components in the P&IDs.

At 940, a visual representation is generated of the subset of the components of the facility, the visual representation based on the determined positions and including one or more of the mapped symbols. The visual representation may include the subset of the components, arranged according to the determined position. Each respective component of the subset of the components may be represented by the symbol mapped to the respective component.

The method 900 may include receiving a query associated with at least one component of the subset of components of the facility and, based on the query, modifying the visual representation of the subset of the components of the facility, as discussed herein.

The method 900 may include receiving user input including one or more criteria and modifying the visual representation of one or more components associated with the one or more criteria. The user input may include a level of detail. The user input may include a selection of a symbol library. The user input may include a selection of a symbol for a component. The user input may include a size, orientation, or position of one or more components.

The method 900 may include receiving user input including a selection of a first component of the components and one or more criteria and, based on the selection, generating a second visual representation including a second subset of the components of the facility connected to the first component, the second subset associated with the one or more criteria. In an example, the user input may include a query to find and display components connected via a flow line to a top tray of a tower. The second visual representation may be based on the visual representation. The visual representation may be modified to generate the second visual representation.

The method 900 may include receiving user input including a selection of a first component and a second component of the components and one or more criteria, and based on the selection, generating a second visual representation including a connection between the first component and the second component. Intermediate components in the connection may be shown based on the intermediate components being associated with the one or more criteria. The connection between the first component and the second component may be a path between the first component and the second component. In some embodiments, the path may be a shortest path between the first and second components. In some embodiments, the visual representation is modified to generate the second visual representation. In some embodiments, the first component and the second component are included in the visual representation and the user input includes a selection from the visual representation of the first component and the second component.

The method 900 may include receiving user input including one or more criteria corresponding to a subsystem of the facility, and based on the one or more criteria, modifying the visual representation to indicate the subsystem. Modifying the visual representation may include adding one or more indicators to the visual representation to indicate the subsystem, including but not limited to highlighting components of the subsystem, adding a box around the subsystem, changing a size of the components of the subsystem, and adding one or more labels to the visual representation.

The method 900 may include receiving user input including proximity data including relative locations of the components of the facility, and updating the graph based on the proximity data. The method 800 may include receiving a user selection of the proximity data, and, based on the selection, modifying the visual representation based on the proximity data. Modifying the visual representation based on the proximity data may include arranging the components in the visual representation to reflect the relative locations of the components in the visual representation. Modifying the visual representation based on the proximity data may include adding one or more indicators to indicate distances between the components. In an example, different colors, shading, or levels of transparency may be used to indicate distance from a selected component.

The method 900 may be performed in substantially real time such that the visual representation is generated in substantially real time. In some embodiments, the visual representation is generated in less than 5 minutes, 10 minutes, or 15 minutes. The visual representation may be modified in substantially real time. In some embodiments, the visual representation is modified in less than 5 minutes, 10 minutes, or 15 minutes.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
obtaining, by one or more processors, a graph comprising components of a facility and connections among the components;
receiving, by the one or more processors, user input comprising proximity data comprising relative physical locations of the components of the facility;
updating, by the one or more processors, the graph based on the proximity data;
receiving, by the one or more processors, via a user interface, a query corresponding to a subset of the components, wherein the query specifies both (i) a subset of the components and (ii) an explicit indication of a desired level of visual detail for viewing the subset of components;
generating, by the one or more processors, based on the graph and according to the query, a visual representation of the subset of the components and connections among the subset of the components by mapping each of the subset of components to a symbol, wherein the visual representation includes only the symbols mapped to the subset of the components specified in the query and presents the symbols mapped to the subset of components and the connections among the subset of the components at the desired level of visual detail indicated in the query;
displaying, by the one or more processors, via the user interface, the visual representation;
receiving, by the one or more processors, a user selection of the proximity data; and
based on the selection, modifying, by the one or more processors, the visual representation based on the proximity data to arrange the symbols mapped to the subset of the components to reflect the relative physical locations of the subset of components.

2. The method of claim 1, further comprising dynamically adjusting, by the one or more processors, the level of detail of the visual representation based on a user selection.

3. The method of claim 1, further comprising:
receiving, by the one or more processors, user input comprising one or more criteria; and
modifying, by the one or more processors, the visual representation of one or more components of the components associated with the one or more criteria.

4. The method of claim 1, further comprising:
receiving, by the one or more processors, user input comprising a selection of a first component of the components and one or more criteria; and
based on the selection, generating, by the one or more processors, a second visual representation comprising a second subset of the components of the facility connected to the first component, the second subset associated with the one or more criteria.

5. The method of claim 1, further comprising:
receiving, by the one or more processors, user input comprising a selection of a first component and a second component of the components and one or more criteria; and
based on the selection, generating, by the one or more processors, a second visual representation comprising a connection between the first component and the second component, wherein intermediate components of the components on the connection are associated with the one or more criteria.

6. The method of claim 5, wherein the connection is a shortest path between the first component and the second component.

7. The method of claim 1, further comprising receiving, by the one or more processors, user input comprising one or more criteria corresponding to a subsystem of the facility; and
based on the one or more criteria, modifying, by the one or more processors, the visual representation to indicate the subsystem.

8. A non-transitory, computer-readable medium comprising instructions which, when executed by one or more processors, cause the one or more processors to:
obtain a graph comprising components of a facility and connections among the components;
receive user input comprising proximity data comprising relative physical locations of the components of the facility;
update the graph based on the proximity data;
receive a query, via a user interface, corresponding to a subset of the components, wherein the query specifies both (i) a subset of the components and (ii) an explicit indication of a desired level of visual detail for viewing the subset of components;
generate, based on the graph and according to the query, a visual representation of the subset of the components and connections among the subset of the components by mapping each of the subset of components to a symbol, wherein the visual representation includes only the symbols mapped to the subset of the components specified in the query and presents the symbols mapped to the subset of components and the connections among the subset of the components at the desired level of visual detail indicated in the query;
display, via the user interface, the visual representation;
receive a user selection of the proximity data; and
based on the selection, modify the visual representation based on the proximity data to arrange the symbols mapped to the subset of the components to reflect the relative physical locations of the subset of components.

9. The non-transitory, computer-readable medium of claim 8, and wherein the one or more processors further execute the instructions to dynamically adjust the level of detail of the visual representation based on a user selection.

10. The non-transitory, computer-readable medium of claim 8, wherein the one or more processors further execute the instructions to:
receive user input comprising one or more criteria; and
modify the visual representation of one or more components of the subset of the components associated with the one or more criteria.

11. The non-transitory, computer-readable medium of claim 8, wherein the one or more processors further execute the instructions to:
receive user input comprising a selection of a first component of the components and one or more criteria; and
based on the selection, generate a second visual representation comprising a second subset of the components of the facility connected to the first component, the second subset associated with the one or more criteria.

12. The non-transitory, computer-readable medium of claim 8, wherein the one or more processors further execute the instructions to:
receive user input comprising a selection of a first component and a second component of the components and one or more criteria; and based on the selection, generate a second visual representation comprising a connection between the first component and the second component, wherein intermediate components of the components on the connection are associated with the one or more criteria.

13. The non-transitory, computer-readable medium of claim 12, wherein the connection is a shortest path between the first and second component.

14. The non-transitory, computer-readable medium of claim 8, wherein the one or more processors further execute the instructions to:
receive user input comprising one or more criteria corresponding to a subsystem of the facility; and
based on the one or more criteria, modify the visual representation to indicate the subsystem.

15. A method comprising:
obtaining, by one or more processors, a graph comprising components of a facility, connections among the components, and proximity data comprising relative physical locations of the components of the facility;
determining, by the one or more processors, based on the proximity data included in the graph, a position associated with each of a subset of the components of the facility;
mapping, by the one or more processors, based on the graph, each of the subset of the components of the facility to a symbol;
generating, by the one or more processors, a visual representation of the subset of the components of the facility, the visual representation based on the determined positions and including one or more of the mapped symbols;
receiving, by the one or more processors, via a user interface, a query associated with at least one component of the subset of components of the facility, the query including a level of detail;
based on the query, modifying, by the one or more processors, the visual representation of the subset of the components of the facility such that the visual representation of the subset of the components of the facility includes only the symbols mapped to the subset of the components of the facility based on the level of detail; and
displaying, by the one or more processors, via the user interface, the modified visual representation of the subset of the components of the facility.

* * * * *